United States Patent
McMaster (10) Patent No.: US 7,086,252 B2
(45) Date of Patent: Aug. 8, 2006

(54) SYSTEM AND METHOD FOR CONTINUOUS FORMING OF GLASS SHEETS

(75) Inventor: Ronald A. McMaster, Perrysburg, OH (US)

(73) Assignee: Glasstech, Inc., Perrysburg, OH (US)

(*) Notice: Subject to any disclaimer, the term of this patent is extended or adjusted under 35 U.S.C. 154(b) by 94 days.

(21) Appl. No.: 10/865,371

(22) Filed: Jun. 10, 2004

(65) Prior Publication Data

US 2005/0274147 A1 Dec. 15, 2005

(51) Int. Cl.
*C03B 23/033* (2006.01)
*C03B 23/035* (2006.01)

(52) U.S. Cl. .............. 65/106; 65/107; 65/268; 65/273

(58) Field of Classification Search ............ 65/106, 65/107, 273, 275, 287–291, 114, 118, 119, 65/268, 370.1
See application file for complete search history.

(56) References Cited

U.S. PATENT DOCUMENTS

| | | | | |
|---|---|---|---|---|
| 4,540,426 A | * | 9/1985 | Bocelli et al. ............... | 65/273 |
| 4,883,527 A | * | 11/1989 | McMaster et al. ............ | 65/273 |
| 4,966,618 A | * | 10/1990 | Letemps et al. .............. | 65/106 |
| 5,368,625 A | | 11/1994 | Mizusugi | |
| 5,443,609 A | * | 8/1995 | Lehto .......................... | 65/268 |
| 5,498,275 A | | 3/1996 | Reunamaki | |
| 5,545,245 A | | 8/1996 | Mizusugi | |
| 5,556,444 A | | 9/1996 | Reunamaki | |
| 5,697,999 A | | 12/1997 | Reunamaki | |
| 5,735,922 A | | 4/1998 | Woodward et al. | |
| 5,928,398 A | * | 7/1999 | Lehto .......................... | 65/104 |
| 5,970,745 A | * | 10/1999 | Lehto .......................... | 65/17.1 |
| 6,378,339 B1 | | 4/2002 | Zalesak et al. | |
| 6,513,348 B1 | * | 2/2003 | Shetterly et al. ............. | 65/104 |
| 6,722,160 B1 | * | 4/2004 | Nemugaki et al. ............ | 65/114 |
| 6,783,358 B1 | * | 8/2004 | Lewandowski et al. ..... | 432/144 |
| 2002/0189291 A1 | * | 12/2002 | Bennett et al. ................ | 65/106 |

FOREIGN PATENT DOCUMENTS

| | | |
|---|---|---|
| FR | 2 221 409 | 10/1974 |
| WO | WO 02/102726 A1 | 12/2002 |
| WO | WO 02/102727 A1 | 12/2002 |
| WO | WO 03/010100 A1 | 2/2003 |

* cited by examiner

*Primary Examiner*—Carlos Lopez
(74) *Attorney, Agent, or Firm*—Brooks Kushman P.C.

(57) ABSTRACT

A glass sheet forming system (20) includes a roll bending station (28) having a lower roll conveyor (30) and an upper roll former (32) between which a heated glass sheet is progressively formed with a curved shape by lower and upper rolls (50) and (52) supported on lower and upper elongated beams (46) and (48) that extend along the direction of conveyance.

16 Claims, 6 Drawing Sheets

SYSTEM AND METHOD FOR CONTINUOUS FORMING OF GLASS SHEETS

BACKGROUND OF THE INVENTION

1. Field of the Invention

This invention relates to a system and method for continuous forming of glass sheets.

2. Background Art

Glass sheet press bending has previously been performed with a prebending that takes place after the glass sheets exit a furnace but before transfer to a press bending station where the press bending takes place. See, for example, U.S. Pat. No. 5,368,625 Mizusugi, U.S. Pat. No. 5,545,245 Mizusugi and U.S. Pat. No. 5,735,922 Woodward et al., which disclose a roll bending station located between the exit end of the associated furnace and a press bending station. The roll bending station disclosed by the above patents has horizontal rolls and laterally spaced sets of inclined bending rolls located downstream from the furnace with the inclined rolls provided in sets having progressively increasing inclination along the direction of conveyance to form each heated glass sheet during conveyance over the inclined rolls. See also PCT international application publication nos.: WO 02/102726 Bennett; WO 02/102727 Bennett et al.; and WO 03/010100 Bennett et al., which disclose a roll bending station located within the furnace adjacent its exit end. The roll bending station of these PCT applications has horizontal rolls and laterally spaced sets of inclined bending rolls located within the furnace adjacent its exit with the inclined rolls provided in sets having progressively increasing inclination along the direction of conveyance to form each heated glass sheet during conveyance over the inclined rolls, and a press bending station is located downstream from the furnace receives the formed glass sheet from the furnace for press bending. Press bending of glass sheets is conventionally performed between a pair of full surface molds or between a full surface mold and a peripheral ring to provide the glass sheet bending.

As disclosed by French Patent 2221409 of inventor Maurice Nedelec, heated glass sheets have also previously been bent by conveyor rolls that are supported and rotatively driven outside of a furnace heating chamber with ends projecting inwardly into the furnace initially in a horizontal orientation. All of the rolls are subsequently simultaneously tilted to form the heated glass sheet within the heated chamber.

SUMMARY OF THE INVENTION

One object of the present invention is to provide a forming system for providing continuous forming of glass sheets.

In carrying out the above object, the glass sheet forming system of the invention includes a roll bending station for receiving heated glass sheets for forming of the glass sheets. The roll bending station includes a lower roll conveyor and an upper roll former located above the lower roll conveyor. The lower roll conveyor has a plurality of lower elongated beams having upstream and downstream ends and intermediate portions extending therebetween along the direction of conveyance. Lower rolls are mounted by the lower elongated beams spaced along the direction of conveyance extending transversely with respect thereto. An upstream lower support mounts the upstream ends of the lower elongated beams so the most upstream lower roll is straight. A downstream lower support mounts the downstream ends of the lower elongated beams to support the most downstream lower roll with a predetermined curvature and to support the other rolls with progressively increasing curvatures from the most upstream straight lower roll to the most downstream curved lower roll. The upper roll former of the roll bending station includes a plurality of elongated beams having upstream and downstream ends and intermediate portions extending therebetween along the direction of conveyance. Upper rolls are mounted by the upper elongated beams spaced along the direction of conveyance extending transversely with respect thereto. An upstream upper support mounts the upstream ends of the upper elongated beams so the most upstream upper roll is straight. A downstream upper support mounts the downstream ends of the upper elongated beams to support the most downstream upper roll with a curvature complementary to the curvature of the most downstream lower roll and to support the other upper rolls with progressively increasing curvatures from the most upstream straight upper roll to the most downstream curved upper roll. A drive mechanism rotatively drives the lower rolls of the lower conveyor to receive each heated upper glass sheet and provide conveyance thereof between the lower roll conveyor and the upper roll former and thereby form the glass sheet to the curved shape of the most downstream lower and upper rolls in a direction transverse to the direction of conveyance.

In one embodiment, the lower roll conveyor and the upper roll former respectively have lower and upper central axes that extend with straight shapes along the direction of conveyance in a horizontal manner such that each glass sheet is formed with a cylindrical shape corresponding to the most downstream lower and upper rolls.

In another embodiment, the lower roll conveyor and the upper roll former respectively have lower and upper central axes that extend with upwardly curved shapes downstream along the direction of conveyance such that each glass sheet is formed with a curved shape transversely to the direction of conveyance corresponding to the curvature of the most downstream lower and upper rolls and is also formed with a cross curvature corresponding to the upwardly curved shapes of the central axes along the direction of conveyance.

In one construction, the upstream lower and upper supports include universal joints that mount the upstream ends of the lower and upper elongated beams to permit vertical, horizontal and twisting movement of the downstream ends of the lower and upper elongated beams. The lower and upper downstream supports of this construction include linkages that mount and provide vertical, horizontal and twisting movement of the downstream ends of the lower and upper elongated beams to adjust the curvatures of all of the lower and upper rolls except the most upstream rolls to thereby provide adjustment of the curvature to which each glass sheet is formed between the lower roll conveyor and the upper roll former.

In another construction, the upstream lower and upper supports include fixed connections that mount the upstream ends of the lower and upper elongated beams. The lower and upper downstream supports include linkages that mount and provide vertical, horizontal and twisting movement of the downstream ends of the lower and upper elongated beams as the elongated beams elastically flex vertically and horizontally and elastically twist to permit such movement to adjust the curvatures of all of the lower and upper rolls except the most upstream lower and upper rolls to thereby provide adjustment of the curvature to which each glass sheet is formed between the lower roll conveyor and the upper roll former.

The glass sheet forming system is also disclosed as including a buffer station located downstream from the roll bending station and including a lower roll conveyor and an upper roll former. The lower roll conveyor of the buffer station has lower curved rolls with the same curvature as the most downstream curved lower roll of the lower roll conveyor of the roll bending station, and the upper roll former of the buffer station has curved upper rolls with the same curvature as the most downstream curved upper roll of the upper roll former of the roll bending station.

The glass sheet forming system also includes a quench station to which the formed glass sheet is conveyed for rapid cooling which may be either to a lesser degree to provide heat strengthening or to a greater degree to provide tempering.

Another object of the present invention is to provide an improved method for forming glass sheets.

In carrying out the above object, the glass sheet forming method of the invention is performed by heating a flat glass sheet during conveyance thereof along a direction of conveyance toward a roll bending station. The heated flat glass sheet is received at the roll bending station on a lower roll conveyor including a plurality of lower elongated beams having upstream and downstream ends and intermediate portions extending therebetween along the direction of conveyance with lower rolls mounted by the lower elongated beams spaced along the direction of conveyance extending transversely with respect thereto. The upstream ends of the lower elongated beams are supported so the most upstream lower roll is straight, and the downstream ends of the lower elongated beams are supported with a predetermined curvature to support the other lower rolls with progressively increasing curvatures from the most upstream straight lower roll to the most downstream curved lower roll. An upper roll former is positioned above the lower roll conveyor with the upper roll former including a plurality of upper elongated beams having upstream and downstream ends and intermediate portions extending therebetween along the direction of conveyance with upper rolls mounted on the upper elongated beams spaced along the direction of conveyance extending transversely with respect thereto. The upstream ends of the upper elongated beams are mounted so the most upstream upper roll is straight, and the downstream ends of the upper elongated beams support the most downstream upper roll with a curvature complementary to the curvature of the most downstream curved lower roll and to support the other upper rolls with progressively increasing curvatures from the most upstream straight upper roll to the most downstream curved upper roll. The lower rolls of the lower roll conveyor are rotatively driven to receive the heated glass sheet and provide conveyance thereof between the lower roll conveyor and the upper roll former and thereby forms the glass sheet to the curved shape of the most downstream lower and upper curved rolls in a direction transverse to the direction of conveyance.

In one practice of the method, the heated flat glass sheet is conveyed horizontally along straight lower and upper central axes of the lower roll conveyor and the upper roll former such that each glass sheet is formed with a cylindrical shape corresponding to the curvature of the most downstream lower and upper curved rolls.

In another practice of the method, the heated flat glass sheet is conveyed along the direction of conveyance horizontally and upwardly with a curved shape along lower and upper central curved axes of the lower roll conveyor and the upper roll former such that each glass sheet is formed with a curved shape transversely to the direction of conveyance corresponding to the curvature of the most downstream lower and upper curved rolls and is also formed with a cross curvature corresponding to the upwardly curved shapes of the central axes along the direction of conveyance.

In one practice of the glass sheet forming method, upstream lower and upper supports mount the upstream ends of the lower and upper elongated beams with universal joints to permit vertical, horizontal and twisting movement of the downstream ends of the lower and upper elongated beams, and lower and upper downstream supports mount and provide vertical, horizontal and twisting movement of the downstream ends of the lower and upper elongated beams with linkages to adjust the curvatures of all of the lower and upper rolls except the most upstream lower and upper straight rolls to thereby provide adjustment of the curvature to which each glass sheet is formed between the lower roll conveyor and the upper roll former.

In another practice of the method, upstream lower and upper supports mount the upstream ends of the lower and upper elongated beams with fixed connections, and the lower and upper downstream supports mount and provide vertical, horizontal and twisting movement of the downstream ends of the lower and upper elongated beams with linkages as the elongated beams elastically flex vertically and horizontally and elastically twist to permit such movement to adjust the curvatures of all of the lower and upper rolls except the most upstream lower and upper straight rolls to thereby provide adjustment of the curvature to which each glass sheet is formed between the lower roll conveyor and the upper roll former.

The method is also performed by conveying the formed glass sheet from the roll bending station to a buffer station including: a lower roll conveyor having lower curved rolls with the same curvature as the downstream curved lower roll of the lower roll conveyor of the roll bending station, and an upper roll former having curved upper rolls with the same curvature as the most downstream curved upper roll of the upper roll former of the roll bending station.

The glass sheet forming method also is performed by conveying the formed glass sheet to a quench station for rapid cooling, either to a lesser extent to provide heat strengthening or to a greater extent to provide tempering.

The objects, features and advantages of the present invention are readily apparent from the following detailed description of the preferred embodiments for practicing the invention as defined by the following drawings.

DETAILED DESCRIPTION OF THE PREFERRED EMBODIMENTS

Figure 1:
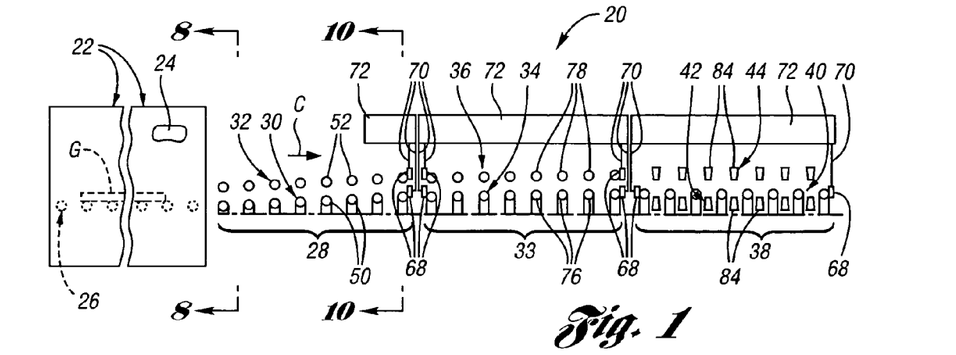
FIG. 1 is a somewhat schematic partially broken away side elevational view of a system for forming glass sheets in accordance with the invention.

With reference to FIG. 1, a glass sheet forming system constructed in accordance with the invention is generally indicated by 20 and is operable to perform the method of the invention for forming glass sheets. Both the system and the method will be described in an integrated manner to facilitate an understanding of all aspects of the invention.

With continuing reference to FIG. 1, the glass sheet forming system 20 includes a furnace 22 having a heating chamber 24 in which glass sheets G are heated while conveyed on a suitable conveyor 26. After such heating, the glass sheets are conveyed to a roll bending station 28 of the system and formed between a lower roll conveyor 30 and an upper roll former 32 as is hereinafter more fully described. After the forming, the glass sheets are conveyed to a buffer station 33 at which the formed shape of the glass sheets is maintained between a lower roll conveyor 34 and an upper roll former 36 of this station. System 20 also includes a quench station 38 to which the formed glass sheets are conveyed on a roll conveyor 40 located between lower and upper quench heads 42 and 44 for rapid cooling that provides toughening of the formed glass sheets. This rapid cooling may be relatively slight in extent to provide heat strengthening or greater to provide tempering.

Figure 2:
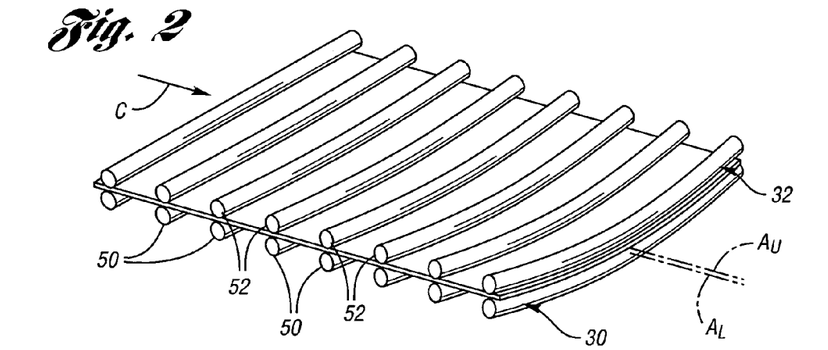
FIG. 2 is a schematic perspective view of a lower roll conveyor and an upper roll former of a roll bending station of the system.
Figure 3:
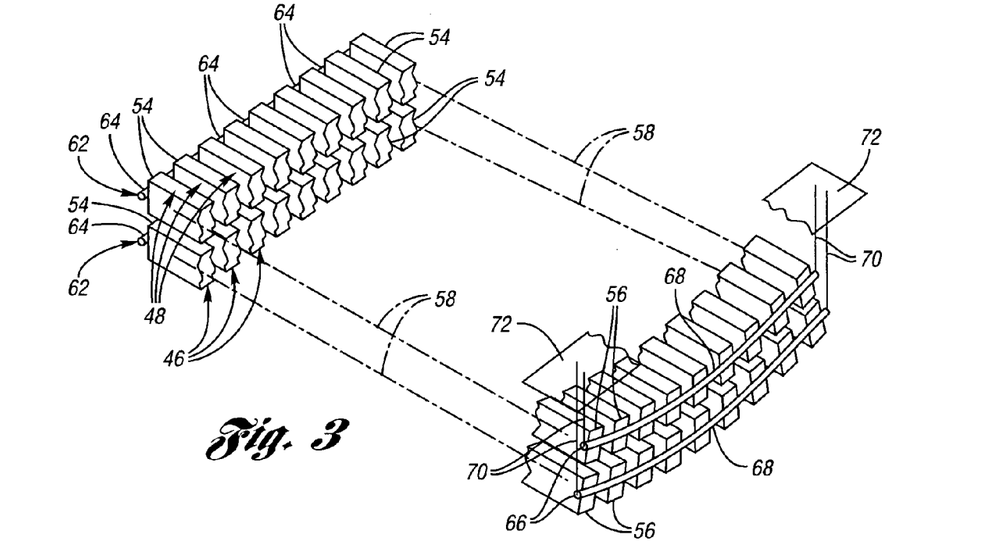
FIG. 3 is a broken away perspective view illustrating lower and upper elongated beams that respectively support the lower roll conveyor and upper roll former illustrated in FIG. 2, with upstream ends of the elongated beam supported by universal joints and with downstream ends thereof supported by linkages.
Figures 8, 9:
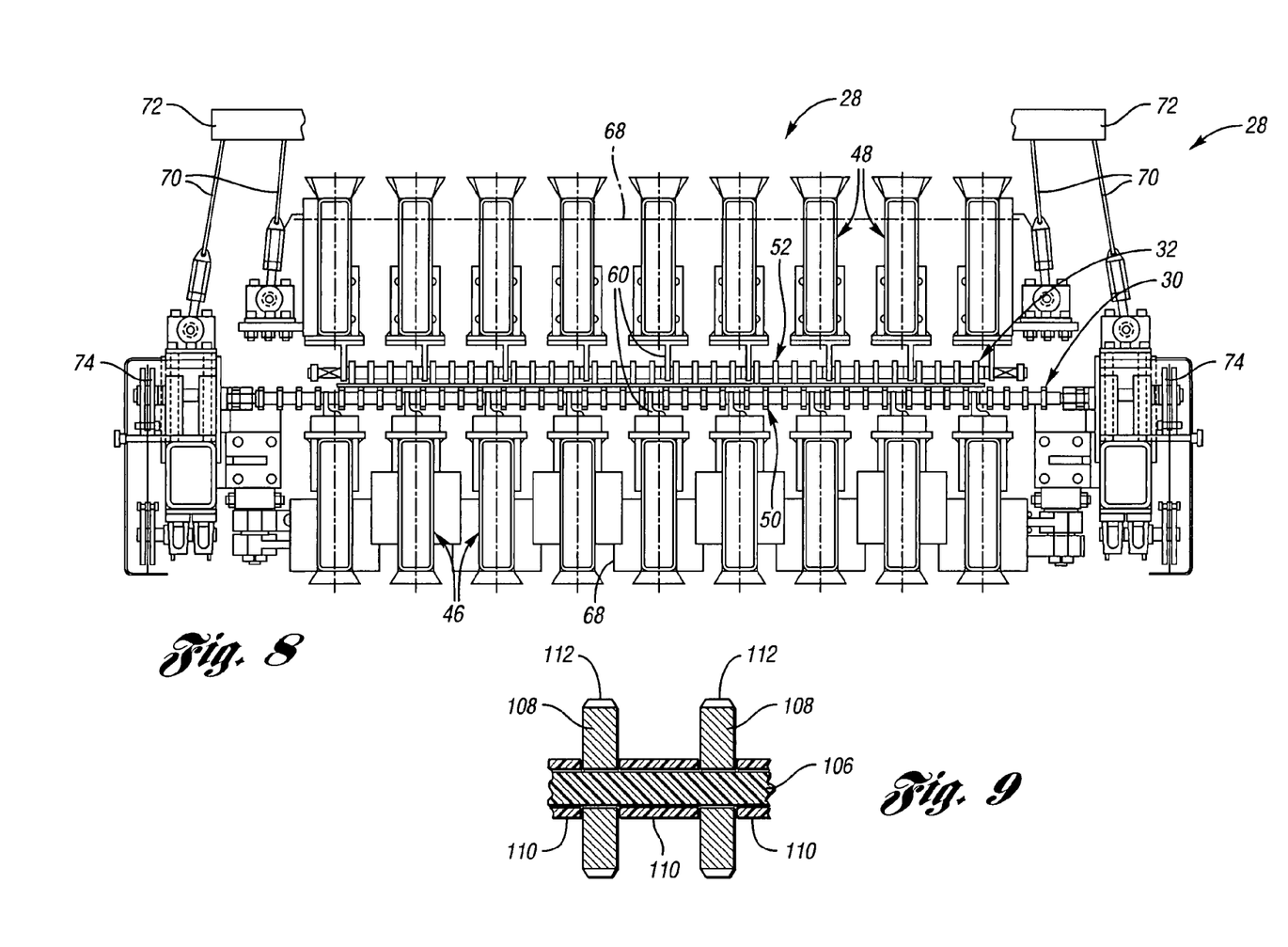
FIG. 8 is a cross sectional view through the roll bending station taken along the direction of line 8—8 in FIG. 1 at its upstream end to illustrate straight rolls of the lower roll conveyor and upper roll former at this location.
FIG. 9 is a sectional view that illustrates the construction of the rolls of both the lower roll conveyor and the upper roll former.
Figure 10:
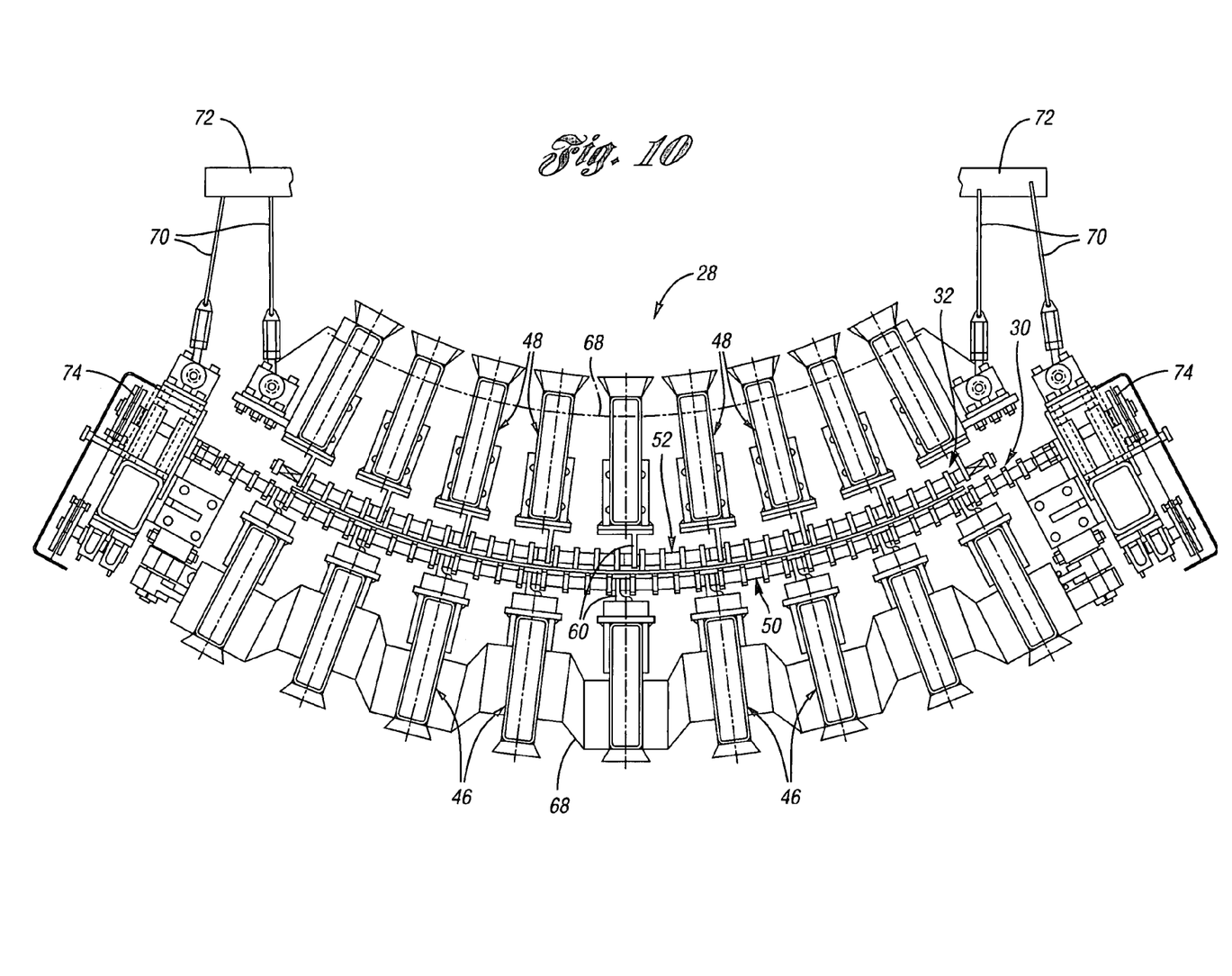
FIG. 10 is a cross sectional view through the downstream end of the roll bending station along the direction of line 10—10 in FIG. 1 to illustrate lower and upper curved rolls of the lower roll conveyor and upper roll former at this location.

The roll bending station 28 illustrated in FIG. 1 is further illustrated in FIGS. 2 and 3 as well as in FIGS. 8–10. More specifically, the lower roll conveyor and upper roll former include a plurality of lower and upper elongated beams 46 and 48, respectively, that extend along a direction of conveyance C of the system and provide mounting of associated lower and upper rolls 50 and 52 between which the heated glass sheet is formed. The lower and upper elongated beams 46 and 48 as best shown in FIG. 3 have upstream ends 54, downstream ends 56 and intermediate portions 58 extending between the upstream and downstream ends. The lower and upper rolls 50 and 52 are spaced along the direction of conveyance as shown in FIG. 2 and are supported by mounts 60 shown in FIGS. 8 and 10 on the lower and upper elongated beams 46 and 48, respectively.

As illustrated in FIG. 3, lower and upper supports 62 support the upstream ends 54 of the lower and upper elongated beams which support the most upstream lower and upper rolls 50 and 52 with straight shapes as illustrated in FIG. 8. These lower and upper supports 62 illustrated in FIG. 3 are constructed in this embodiment as suitable universal joints 64 that permit the downstream ends 56 of the elongated beams to move vertically and horizontally as well as rotating about their elongated lengths. At the downstream end of the roll bending station, lower and upper supports 66 mount the downstream ends 56 of the lower and upper elongated beams 46 and 48 which support the most downstream lower and upper rolls 50 and 52 with curved shapes of a predetermined curvature to which the glass sheet is to be formed as shown in FIG. 10. Furthermore, the intermediate lower and upper rolls 50 and 52 between the most upstream straight rolls and the most downstream curved rolls are supported on the elongated beams 58 with progressively increasing curvatures so that the heated flat glass sheets are progressively formed to the final curved shape during conveyance through the roll bending station. The lower and upper downstream supports 66 are constructed as linkages 68 with opposite lateral ends secured by associated connectors 70 to an actuator 72 that permits adjustment of the final curvature to which the heated glass sheets are formed by the roll bending station. At each position along the direction of conveyance in the roll bending station, the upper roll former 32 has a complementary shape to the lower roll conveyor 30 so as to provide the forming of the glass sheet progressively as previously discussed.

As shown in FIGS. 8 and 10, the lower roll conveyor 30 includes a drive mechanism 74 that rotatively drives the opposite ends of the lower rolls 50 to provide the glass sheet conveyance during the progressive forming to the final curved shape. The upper rolls 52 are freewheeling and are thus not rotatively driven. The rotational driving of the lower curved rolls 50 may be by a drive mechanism as disclosed by U.S. Pat. No. 5,498,275 Reunamaki; U.S. Pat. No. 5,556,444 Reunamaki; U.S. Pat. No. 5,697,999 Reunamaki; and U.S. Pat. No. 6,378,339 Zalesak, the entire disclosures of which are hereby incorporated by reference.

Figure 4:
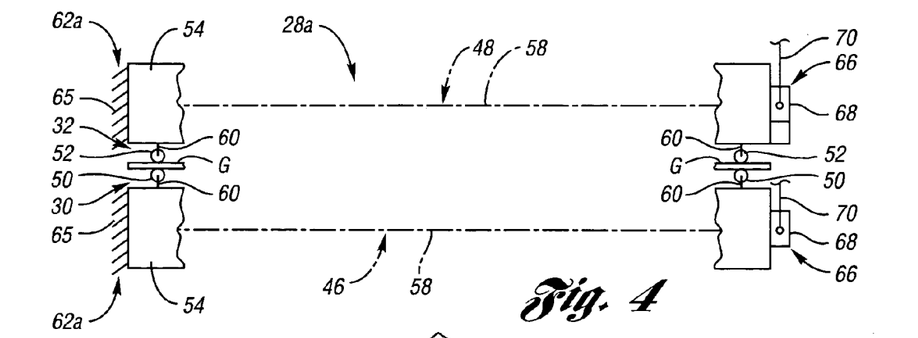
FIG. 4 is a partially broken away side elevational view of another embodiment wherein the upstream ends of the elongated beams have fixed connections and their downstream ends move vertically, horizontally and twist to provide curvature.

With reference to FIG. 4, another embodiment of the roll bending station 28a has the same construction as the previously described embodiment but has its lower and upper upstream supports 62a provided with fixed connections 65 to a suitable framework, and the lower and upper elongated beams 46 and 48 are constructed to flex under the adjustment of the downstream lower and upper support linkages 68 so as to permit vertical, horizontal and twisting movement of the downstream ends 56 to adjust the curvatures of all of the lower and upper rolls 50 and 52, except for the most upstream lower and upper straight rolls. Thus, unlike the embodiment of FIG. 3 wherein the universal joints 64 permit the downstream end adjustment, this embodiment has elastic flexing for vertical and horizontal movement and elastic twisting to permit the necessary adjustment to different curved shapes as illustrated in FIG. 10.

The buffer station 33 illustrated in FIG. 1 has its lower roll conveyor 34 and upper roll former 36 provided with lower curved rolls 76 and upper curved rolls 78, respectively, that have the same curvature as the most downstream lower and curved rolls 50 and 52 of the roll bending station 24. Thus, the cross section of the buffer station is the same as that shown in FIG. 10. More specifically the upstream and downstream ends of the buffer station 33 have lower and upper linkages 68 that respectively support the upstream and downstream ends of the lower and upper elongated members of the buffer station through the use of linkages 68. Likewise, connections 70 to the ends of the linkage extend to an associated actuator 72 that permits adjustment of the curvature to the shape of the glass sheet forming performed in the roll bending station.

Figure 11:
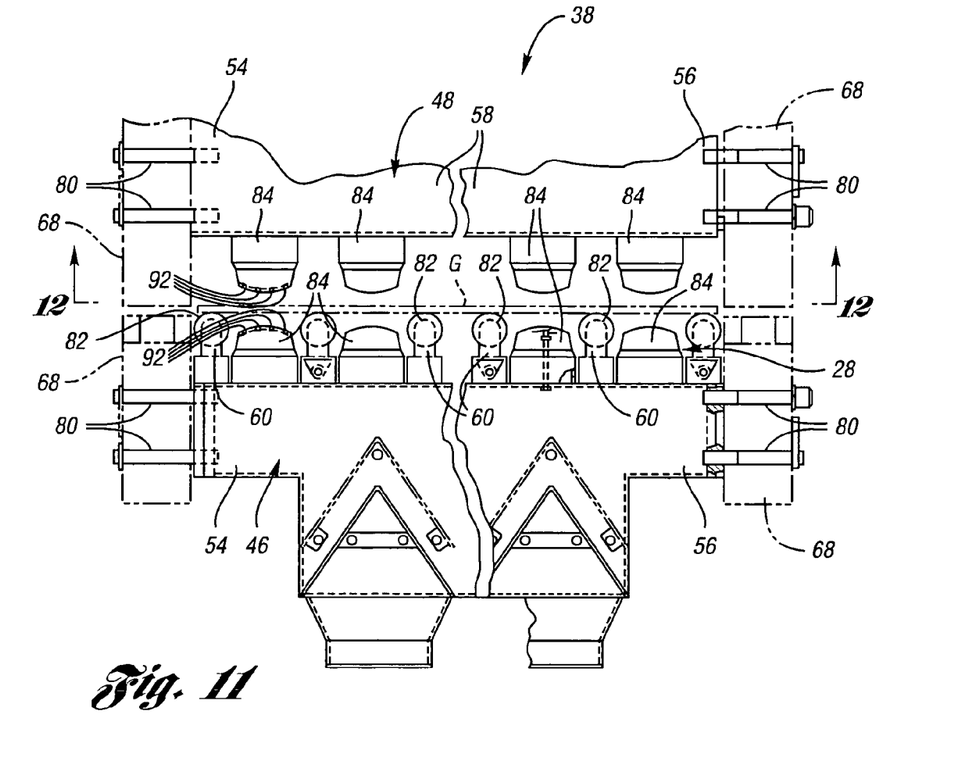
FIG. 11 is an enlarged side elevational view of a quench station of the system for providing rapid cooling that toughens the formed glass sheets.
Figure 12:
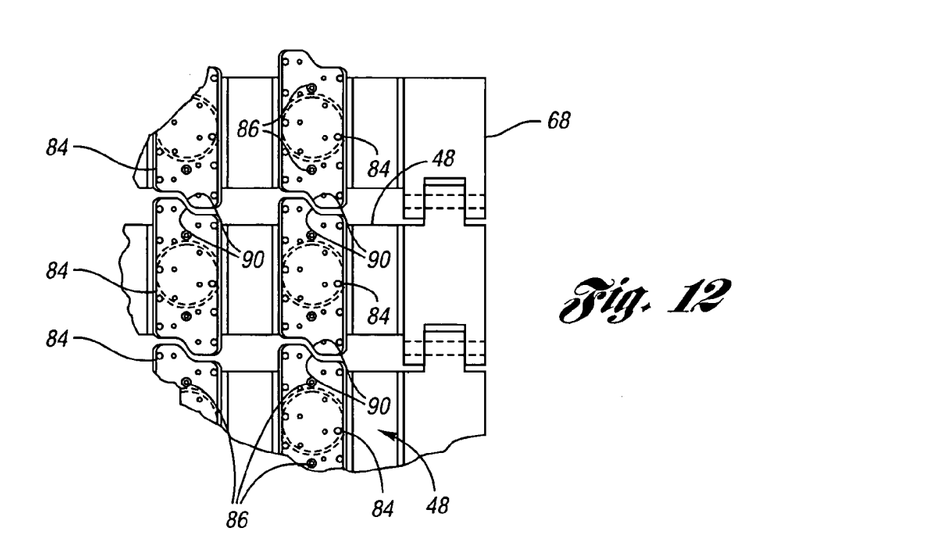
FIG. 12 is a bottom plan view taken along the direction of line 12—12 in FIG. 11 to illustrate the quench construction.
Figure 13:
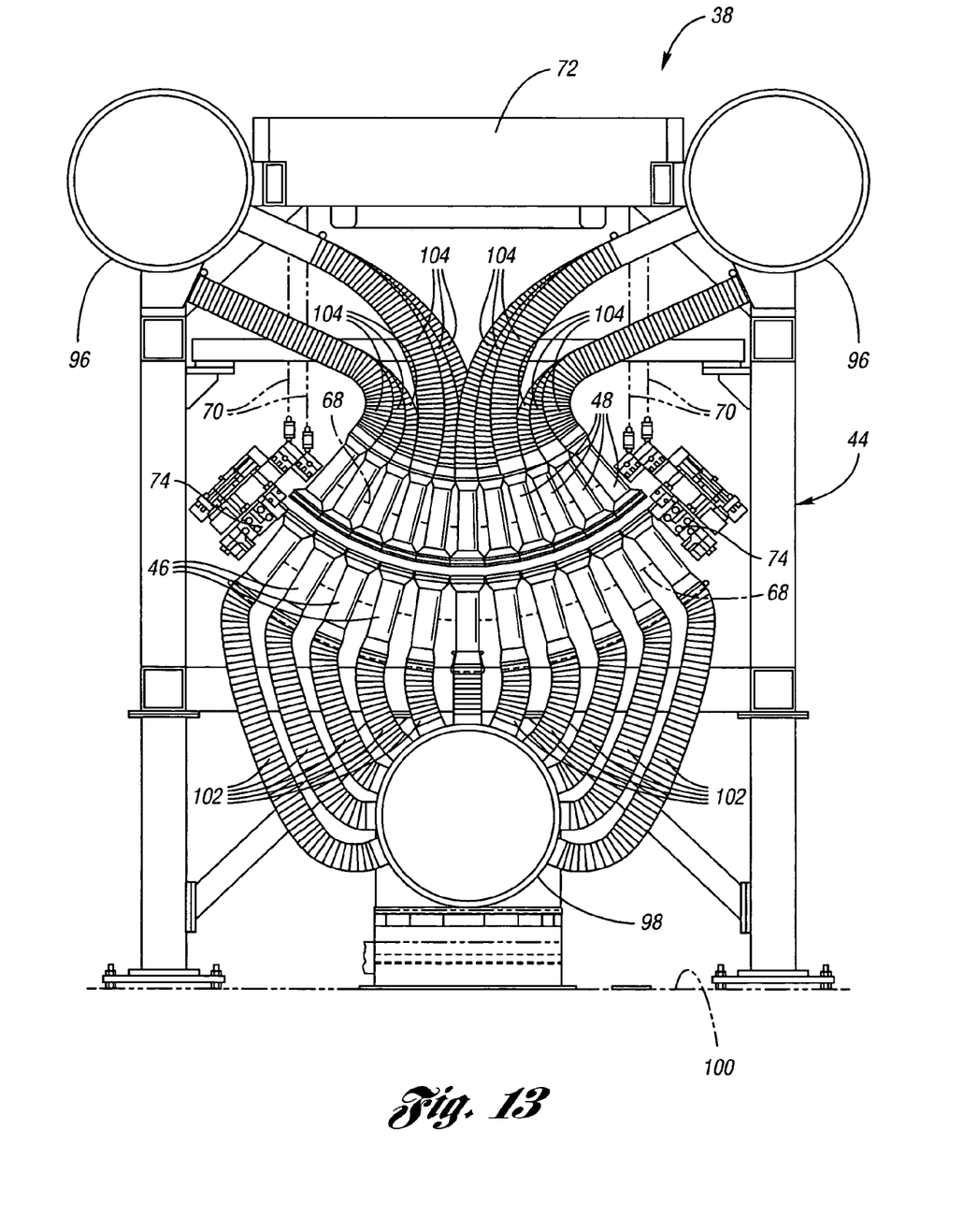
FIG. 13 is a cross sectional view through the quench station taken along the direction of line 13—13 in FIG. 11 to further illustrate the construction of the quench station.

The quench station 38 shown in FIG. 1 is located downstream along the direction of conveyance C from the buffer station 33 as previously mentioned. This quench station is also illustrated in FIGS. 11–13 and includes lower and upper elongated beams 46 and 48 that extend along the direction of conveyance and have upstream and downstream ends 54 and 56 as well as intermediate portions 58 extending between these ends. At both the upstream and downstream ends, lower and upper linkages 68 have connections 80 to the upstream and downstream ends 54 and 56 of the elongated beams. Furthermore, the lower elongated beams 54 have rolls 82 rotatably supported thereon by the mounts 60, but there are no upper rolls as in the other stations.

As illustrated in both FIGS. 11 and 12, the lower and upper elongated beams 44 and 46 function as quench tubes and respectively mount quench plenums 84. Each quench plenum 84 has a two piece cast aluminum construction which is secured by connectors 86 (FIG. 12) such that a round inlet 88 of each quench plenum supplies the quenching gas from the associated elongated tubular beam. Quench plenums 84 have opposite ends 90 that interfit and thereby permit quench openings 92 in the quench plenums to be located relatively close to each other to provide uniform quenching.

With reference to FIG. 13, the quench station 38 includes a framework 94 that supports a pair of upper quench tubes 96 that have elongated round shapes like a lower quench tube 98 that is mounted on the factory floor 100. At its upper extremity, the framework 94 supports the actuator 72 whose connections 70 to the linkages provide adjustment of the curvature at the quench station in the same manner that can be accomplished at the roll bending station 28 and the buffer station 33 previously described. Flexible quench conduits 102 extend between the lower quench tube 98 and the lower elongated beams 46 to supply quenching gas to their quench plenums previously described in connection with FIG. 12. Likewise as shown in FIG. 13, flexible quench conduits 104 extend between the upper quench tubes 96 and the upper elongated beams 48 to supply quenching gas to their quench plenums. The actuator 72 mounted on the upper extremity of the framework 94 has its connections 70 extending to the linkages 68 that support the opposite ends of the lower and upper elongated beams 46 and 48 to permit adjustment to the appropriate curvature.

Figure 5:
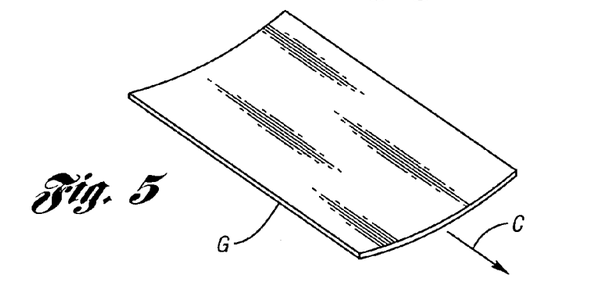
FIG. 5 is a perspective view illustrating the manner in which a glass sheet is cylindrically formed by the system and method of the invention.

The embodiments of the glass sheet forming system illustrated in FIGS. 1–4 have the lower roll conveyor 30 of the roll forming station and the upper roll former 32 provided with lower and upper central axes $A_l$ and $A_u$ with straight shapes along the direction of conveyance in a horizontal manner. Thus, the center of the glass sheet being bent does not change elevation as it moves through the roll bending station 28 from the upstream straight lower and upper rolls 50 and 52 to the most downstream lower and upper curved rolls 50 and 52. Likewise, the lower roll conveyor 34 and the upper roll former 36 of the buffer station also have horizontal central axes as does the lower roll conveyor 40 of the quench station 38. Thus, throughout the movement through the glass sheet forming system 20 illustrated in FIG. 1 from the furnace through the roll forming station and buffer station as well as the quench station, the central portions of the glass sheet being formed are at the same elevation. This forming thus produces a formed glass sheet as illustrated in FIG. 5 wherein there are straight line elements along the direction of conveyance along which the glass sheet G is formed.

Figure 6:
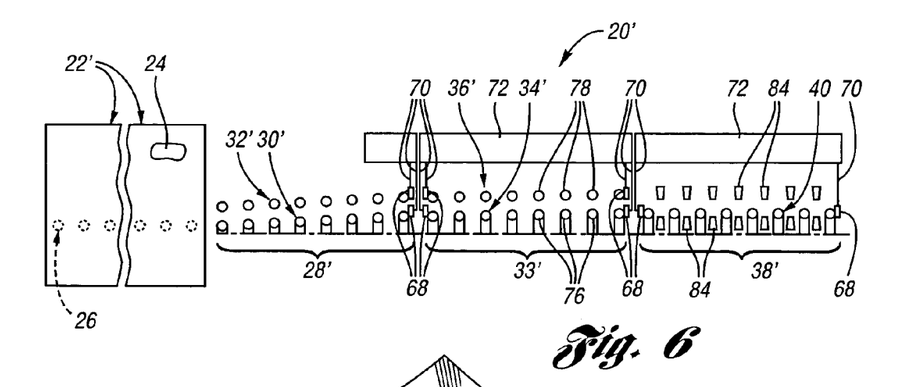
FIG. 6 is a view similar to FIG. 1 of another embodiment of the system which is constructed to permit forming of the glass sheet with cross curvature.
Figure 7:
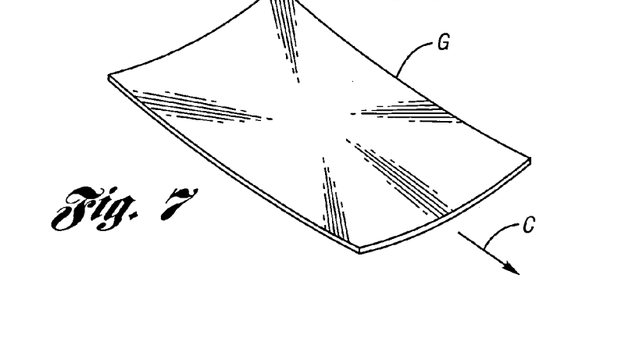
FIG. 7 is a perspective view of a formed glass sheet with curvature in orthogonal directions relative to each other.

With reference to FIG. 6, another embodiment of the glass sheet forming system 20' has generally the same construction as the embodiment described in connection with FIGS. 1–5 but is constructed to provide a slight extent of curvature perpendicular to the main direction of curvature previously described. This additional curvature which is referred to as "cross curvature" is usually not very great in extent, typically on the order of about three to four millimeters of depth of curvature along a one meter length. Such cross curvature is provided by having the lower and upper central axes of the lower roll conveyor 30' and the upper roll former 32' of the quench station 28' extending with upwardly curved shapes downstream along the direction of conveyance. Thus each glass sheet is formed with an upwardly curved shape transverse to the direction of conveyance corresponding to the curvature of the most downstream lower and upper rolls and is also formed with a cross curvature corresponding to the upwardly curved shapes of the central axes along the direction of conveyance. Likewise, the buffer station 33 has its lower roll conveyor 34 and upper roll former also each provided with an associated central axis that has an upwardly curved shape along the direction of conveyance so that this curvature is maintained during passage from the roll bending station 28' through the buffer station 33' to the quench station 38' which likewise has its lower roll conveyor provided with a central axis that is curved upwardly in a downstream direction. It is also possible to provide such cross curvature by a downwardly curved conveyance or a downwardly and then upwardly curved conveyance along the length of the system. Such curvatures between the forming station, the buffer station and the quench station should be tangent with each other so as to have a smooth transition from one station to the next. Thus, the intermediate rolls must be located lower than a straight line between the most upstream roll of the forming station and most downstream rolls of the quench station regardless of whether the conveyance is continually upward, continually downward, or downward and then upwardly along the length of the system.

With reference to FIG. 9, the construction of both the lower and upper rolls is illustrated by a longitudinal sectional view showing one of the lower rolls. More specifically, the roll includes a deformable center shaft 106 that can be made from metal or plastic and has opposite ends connected to the drive mechanism 74 illustrated in FIG. 8. Each roll shaft 106 mounts roll wheels 108 that are spaced by tubular spacers 110. The roll wheels 108 have central openings of a square or other shape that provides rotary driving of the wheels by the central shaft 106 for the lower roll. For the upper rolls, the roll wheel opening are round and receive a round shaft since the upper rolls are freewheeling. The mounts 60 (FIGS. 8 and 10) have unshown bushings that provide the rotary support of the central shaft 106 on the associated elongated beams. Each roll wheel has an annular outer cloth covering 112 of an aromatic polyamide fiber. By varying the length of the spacers 110 at successive rolls along the direction of conveyance, it is possible to have the entire surface of the glass sheet engaged by this wheel type roll so that no stripes result in the forming either at the lower side where the lower roll conveyor is located or at the upper side where the upper roll former is located.

The lower and upper linkages 68 associated with the roll bending station, the buffer station and the quench station as previously described will often have construction so as to provide a constant radius of curvature. However, it should be appreciated that it is also possible for the linkages to be constructed to provide varying radii of curvature or to have flat portions. Both the linkages 68 and the actuators 72 as well as other components of the system may have constructions as disclosed by U.S. Pat. No. 5,498,275 Reunamaki; U.S. Pat. No. 5,556,444 Reunamaki; U.S. Pat. No. 5,697,999 Reunamaki and U.S. Pat. No. 6,378,339 Zalesak, whose entire disclosures have been incorporated herein by reference.

While the preferred embodiments for practicing the invention have been described in detail, those familiar with the art to which this invention relates will recognize various alternative designs and embodiments for practicing the invention as defined by the following claims.

What is claimed is:

1. A glass sheet forming system comprising:
   a roll bending station for receiving heated glass sheets for forming thereof, the roll bending station including a lower roll conveyor and an upper roll former located above the lower roll conveyor;
   the lower roll conveyor including a plurality of lower elongated beams having upstream and downstream ends and intermediate portions extending therebetween along a direction of conveyance; lower rolls mounted by the lower elongated beams spaced along the direction of conveyance extending transversely with respect thereto and including a most upstream lower roll, a most downstream lower roll and intermediate lower rolls located along the direction of conveyance between the most upstream lower roll and the most downstream lower roll, an upstream lower support that mounts the upstream ends of the lower elongated beams, the upstream ends of the lower elongated beams supporting the most upstream lower roll with a straight shape, a downstream lower support that mounts the downstream ends of the lower elongated beams, the downstream ends of the lower elongated beams supporting the most downstream lower roll with a predetermined curvature, and the intermediate portions of the lower elongated beams supporting the intermediate lower rolls with progressively increasing curvatures from the most upstream straight lower roll to the most downstream curved lower roll;
   the upper roll former including a plurality of upper elongated beams having upstream and downstream ends and intermediate portions extending therebetween along the direction of conveyance, upper rolls mounted by the upper elongated beams spaced along the direction of conveyance extending transversely with respect thereto and including a most upstream upper roll, a most downstream upper roll and intermediate upper rolls located along the direction of conveyance between the most upstream upper roll and the most downstream upper roll, an upstream upper support that mounts the upstream ends of the upper elongated beams, the upstream ends of the upper elongated beams supporting the most upstream upper roll with a straight shape, a downstream upper support that mounts the downstream ends of the upper elongated beams, the downstream ends of the upper elongated beams supporting the most downstream upper roll with a curvature complementary to the curvature of the most downstream curved lower roll, and the intermediate portions of the upper elongated beams supporting the intermediate upper rolls with progressively increasing curvatures from the most upstream straight upper roll to the most downstream curved upper roll; and
   a drive mechanism for rotatively driving the lower rolls of the lower conveyor to receive each heated glass sheet and provide conveyance thereof between the lower roll conveyor and the upper roll former and thereby form the glass sheet to the curved shape of the most downstream curved lower and upper rolls in a direction transverse to the direction of conveyance.

2. A glass sheet forming system as in claim 1 wherein the lower roll conveyor and the upper roll former respectively have lower and upper central axes that extend with straight shapes along the direction of conveyance in a horizontal manner such that each glass sheet is formed with a cylindrical shape corresponding to the curvature of the most downstream curved lower and upper rolls.

3. A glass sheet forming system as in claim 1 wherein the lower roll conveyor and the upper roll former respectively have lower and upper central axes that extend with upwardly curved shapes downstream along the direction of conveyance such that each glass sheet is formed with a curved shape transversely to the direction of conveyance corresponding to the curvature of the most downstream curved lower and upper rolls and is also formed with a cross curvature corresponding to the upwardly curved shapes of the central axes along the direction of conveyance.

4. A glass sheet forming system as in claim 1 wherein the upstream lower and upper supports include universal joints that mount the upstream ends of the lower and upper elongated beams to permit vertical, horizontal and twisting movement of the downstream ends of the lower and upper elongated beams, and the lower and upper downstream supports including linkages that mount and provide vertical, horizontal and twisting movement of the downstream ends of the lower and upper elongated beams to adjust the curvatures of all of the lower and upper rolls except the most upstream straight rolls to thereby provide adjustment of the curvature to which each glass sheet is formed between the lower roll conveyor and the upper roll former.

5. A glass sheet forming system as in claim 1 wherein the upstream lower and upper supports include fixed connections that mount the upstream ends of the lower and upper elongated beams, and the lower and upper downstream supports including linkages that mount and provide vertical, horizontal and twisting movement of the downstream ends of the lower and upper elongated beams as the elongated beams elastically flex vertically and horizontally and elastically twist to permit such movement to adjust the curvatures of all of the lower and upper rolls except the most upstream straight lower and upper rolls to thereby provide adjustment of the curvature to which each glass sheet is formed between the lower roll conveyor and the upper roll former.

6. A glass sheet forming system as in claim 1 further including a buffer station located downstream from the roll bending station and including a lower roll conveyor and an upper roll former, the lower roll conveyor of the buffer station having lower curved rolls with the same curvature as the most downstream lower curved roll of the lower roll conveyor of the roll bending station, and the upper roll former of the buffer station having curved upper rolls with the same curvature as the most downstream, upper curved roll of the upper roll former of the roll bending station.

7. A glass sheet forming system as in claim 1 further including a quench station to which the formed glass sheet is conveyed for rapid cooling.

8. A glass sheet forming system comprising:

a furnace having a heated chamber in which glass sheets are heated to a sufficiently high temperature for forming;

a roll bending station for receiving the heated glass sheets from the furnace for forming thereof, the roll bending station including a lower roll conveyor that receives and conveys each heated glass sheet away from the furnace along a direction of conveyance, and the roll bending station including an upper roll former located above the lower roll conveyor;

the lower roll conveyor including a plurality of lower elongated beams having upstream and downstream ends and intermediate portions extending therebetween along the direction of conveyance; lower rolls mounted by the lower elongated beams spaced along the direction of conveyance extending transversely with respect thereto and including a most upstream lower roll, a most downstream lower roll and intermediate lower rolls located along the direction of conveyance between the most upstream lower roll and the most downstream lower roll, an upstream lower support that mounts the upstream ends of the lower elongated beams, the upstream ends of the lower elongated beams supporting the most upstream lower roll with a straight shape, a downstream lower support that mounts the downstream ends of the lower elongated beams, the downstream ends of the lower elongated beams supporting the most downstream lower roll with a predetermined curvature, and the intermediate portions of the lower elongated beams supporting the intermediate lower rolls with progressively increasing curvatures from the most upstream straight lower roll to the most downstream curved lower roll;

the upper roll former including a plurality of upper elongated beams having upstream and downstream ends and intermediate portions extending therebetween along the direction of conveyance, upper rolls mounted by the upper elongated beams spaced along the direction of conveyance extending transversely with respect thereto and including a most upstream upper roll, a most downstream upper roll and intermediate upper rolls located along the direction of conveyance between the most upstream upper roll and the most downstream upper roll, an upstream upper support that mounts the upstream ends of the upper elongated members, the upstream ends of the upper elongated beams supporting the most upstream upper roll with a straight shape, a downstream upper support that mounts the downstream ends of the upper elongated beams, the downstream ends of the upper elongated beams supporting the most downstream upper roll with a curvature complementary to the curvature of the most downstream curved lower roll, and the intermediate portions of the upper elongated beams supporting the intermediate upper rolls with progressively increasing curvatures from the most upstream straight upper roll to the most downstream curved upper roll;

a drive mechanism for rotatively driving the lower rolls of the lower conveyor to receive each heated glass sheet from the furnace and provide conveyance thereof between the lower roll conveyor and the upper roll former and thereby form the glass sheet to the curved shape of the most downstream curved lower and upper rolls in a direction transverse to the direction of conveyance;

a buffer station located downstream from the roll bending station and including a lower roll conveyor and an upper roll former, the lower roll conveyor of the buffer station having curved lower rolls with the same curvature as the most downstream curved lower roll of the lower roll conveyor of the roll bending station, and the upper roll former of the buffer station having curved upper rolls with the same curvature as the most downstream curved upper roll of the upper roll former of the roll bending station; and a quench station to which the formed glass sheet is conveyed from the buffer station for rapid cooling.

9. A method for forming glass sheets comprising:

heating a flat glass sheet during conveyance thereof along a direction of conveyance toward a roll bending station;

receiving the heated flat glass sheet at the roll bending station on a lower roll conveyor including a plurality of lower elongated beams having upstream and downstream ends and intermediate portions extending therebetween along the direction of conveyance with lower rolls mounted by the lower elongated beams spaced along the direction of conveyance extending transversely with respect thereto and including a most upstream lower roll, a most downstream lower roll and intermediate lower rolls located along the direction of conveyance between the most upstream lower roll and the most downstream lower roll, supporting the upstream ends of the lower elongated beams which support the most upstream lower roll with a straight shape, supporting the downstream ends of the lower elongated beams which support the most downstream lower roll with a predetermined curvature, and the intermediate portions of the lower elongated beams supporting the intermediate lower rolls with progressively increasing curvatures from the most upstream straight lower roll to the most downstream curved lower roll;

positioning an upper roll former above the lower roll conveyor with the upper roll former including a plurality of upper elongated beams having upstream and downstream ends and intermediate portions extending therebetween along the direction of conveyance with upper rolls mounted on the upper elongated beams spaced along the direction of conveyance extending transversely with respect thereto and including a most upstream upper roll, a most downstream upper roll and intermediate upper rolls located along the direction of conveyance between the most upstream upper roll and the most downstream upper roll, mounting the upstream ends of the upper elongated beams which support the most upstream upper roll with a straight shape, mounting the downstream ends of the upper elongated beams which support the most downstream upper roll with a curvature complementary to the curvature of the most downstream curved lower roll and the intermediate portions of the upper elongated beams supporting the intermediate upper rolls with progressively increasing curvatures from the most upstream straight upper roll to the most downstream curved upper roll; and rotatively driving the lower rolls of the lower roll conveyor to receive the heated glass sheet and provide conveyance thereof between the lower roll conveyor and the upper roll former and thereby form the glass sheet to the curved shape of the most downstream curved lower and upper rolls in a direction transverse to the direction of conveyance.

10. A method for forming glass sheets as in claim 9 wherein the heated flat glass sheet is conveyed horizontally along straight lower and upper central axes of the lower roll conveyor and the upper roll former such that each glass sheet is formed with a cylindrical shape corresponding to the curvature of the most downstream curved lower and upper rolls.

11. A method for forming glass sheets as in claim 9 wherein the heated flat glass sheet is conveyed along the direction of conveyance horizontally and upwardly in a curved shape along lower and upper central curved axes of the lower roll conveyor and the upper roll former such that each glass sheet is formed with a curved shape transversely to the direction of conveyance corresponding to the curvature of the most downstream curved lower and upper rolls and is also formed with a cross curvature corresponding to the upwardly curved shapes of the central axes along the direction of conveyance.

12. A method for forming glass sheets as in claim 9 wherein upstream lower and upper supports mount the upstream ends of the lower and upper elongated beams with universal joints to permit vertical, horizontal and twisting movement of the downstream ends of the lower and upper elongated beams, and wherein the lower and upper downstream supports mount and provide vertical, horizontal and twisting movement of the downstream ends of the lower and upper elongated beams with linkages to adjust the curvatures of all of the lower and upper rolls except the most upstream straight lower and upper rolls to thereby provide adjustment of the curvature to which each glass sheet is formed between the lower roll conveyor and the upper roll former.

13. A method for forming glass sheets as in claim 9 wherein upstream lower and upper supports mount the upstream ends of the lower and upper elongated beams with fixed connections, and wherein the lower and upper downstream supports mount and provide vertical, horizontal and twisting movement of the downstream ends of the lower and upper elongated beams with linkages as the elongated beams elastically flex vertically and horizontally and elastically twist to permit such movement to adjust the curvatures of all of the lower and upper rolls except the most upstream straight lower and upper rolls to thereby provide adjustment of the curvature to which each glass sheet is formed between the lower roll conveyor and the upper roll former.

14. A method for forming glass sheets as in claim 9 wherein the formed glass sheet is conveyed from roll bending station to a buffer station including: a lower roll conveyor having lower curved rolls with the same curvature as the most downstream curved lower roll of the lower roll conveyor of the roll bending station, and an upper roll former having curved upper rolls with the same curvature as the most downstream upper curved roll of the upper roll former of the roll bending station.

15. A method for forming glass sheets as in claim 9 wherein the formed glass sheet is conveyed to a quench station for rapid cooling.

16. A method for forming glass sheets comprising:
heating a flat glass sheet during conveyance thereof along a direction of conveyance toward a roll bending station;
receiving the heated flat glass sheet at the roll bending station on a lower roll conveyor including a plurality of lower elongated beams having upstream and downstream ends and intermediate portions extending therebetween along the direction of conveyance with lower rolls mounted by the lower elongated beams spaced along the direction of conveyance extending transversely with respect thereto and including a most upstream lower roll, a most downstream lower roll and intermediate lower rolls located along the direction of conveyance between the most upstream lower roll and the most downstream lower roll, supporting the upstream ends of the lower elongated beams which support the most upstream lower roll with a straight shape, and supporting the downstream ends of the lower elongated beams which support the most downstream lower roll with a predetermined curvature, and the intermediate portions of the lower elongated beams supporting the intermediate lower rolls with progressively increasing curvatures from the most upstream straight lower roll to the most downstream curved lower roll;
positioning an upper roll former above the lower roll conveyor with the upper roll former including a plurality of upper elongated beams having upstream and downstream ends and intermediate portions extending therebetween along the direction of conveyance with upper rolls mounted on the upper elongated beams spaced along the direction of conveyance extending transversely with respect thereto and including a most upstream upper roll, a most downstream upper roll and intermediate upper rolls located along the direction of conveyance between the most upstream upper roll and the most downstream upper roll, mounting the upstream ends of the upper elongated beams which support the most upstream upper roll with a straight shape, mounting the downstream ends of the upper elongated beams which support the most downstream upper roll with a curvature complementary to the curvature of the most downstream curved lower roll, and the intermediate portions of the upper elongated beams supporting the intermediate upper rolls with progressively increasing curvatures from the most upstream straight upper roll to the most downstream curved upper roll;
rotatively driving the lower rolls of the lower roll conveyor to receive the heated glass sheet and provide conveyance thereof between the lower roll conveyor and the upper roll former and thereby form the glass sheet to the curved shape of the most downstream curved lower and upper rolls in a direction transverse to the direction of conveyance;
conveying the formed glass sheet to a buffer station between a lower roll conveyor and an upper roll former thereof; and
subsequently conveying the formed glass sheet from the buffer station to a quench station for rapid cooling.

* * * * *